United States Patent [19]

Lichti et al.

[11] 4,173,279

[45] Nov. 6, 1979

[54] FLUID METERING AND TRANSFER SYSTEM

[75] Inventors: Robert D. Lichti, Lakewood; Joseph O. Herrera, Buena Park, both of Calif.; Paul J. Ashley, Boise, Idaho.

[73] Assignee: Park Mobile, Inc., New York, N.Y.; by said Joseph O. Herrera and Paul J. Ashley

[21] Appl. No.: 843,266

[22] Filed: Oct. 18, 1977

[51] Int. Cl.² .............................................. F16N 7/18
[52] U.S. Cl. .................................. 198/500; 184/15 B; 222/358; 222/403; 222/405
[58] Field of Search ............... 222/64, 356, 357, 358, 222/403, 405, 363, 366; 184/15 R, 15 B, 103 R; 30/123.4; 198/500

[56] References Cited

U.S. PATENT DOCUMENTS

| | | | |
|---|---|---|---|
| 546,659 | 9/1895 | Fehr | 184/6 |
| 1,200,149 | 10/1916 | Stickney | 184/10 |
| 1,288,765 | 12/1918 | Ulferts | 184/10 |
| 1,416,840 | 5/1922 | Kraut | 222/290 |
| 1,665,451 | 4/1928 | Gates | 184/15 R |
| 1,771,835 | 7/1930 | Bartlett | 184/13 R X |
| 1,929,243 | 10/1933 | Harper | 222/358 X |
| 2,903,995 | 9/1959 | Fitzgerald | 222/358 X |
| 2,978,148 | 4/1961 | Schwartz | 222/357 X |
| 2,979,161 | 4/1961 | Lyden | 184/103 R |

*Primary Examiner*—Robert J. Spar
*Assistant Examiner*—Fred A. Silverberg
*Attorney, Agent, or Firm*—Larson, Taylor & Hinds

[57] ABSTRACT

A fluid metering and transfer system is disclosed in which, in a preferred embodiment, a fluid contained in a reservoir is transferred in small amounts by a dipper wire to a conduit extending through the bottom of the reservoir. The fluid is then distributed by gravity flow through the tube to the desired location. The dipper wire is rigidly mounted onto a pivotable shaft. When the present invention is used for transferring lubricating liquid to machines, the shaft of the present invention can be coupled to a shaft of the machine so that the present invention only transfers and distributes the lubricating liquid when the machine is operating.

16 Claims, 13 Drawing Figures

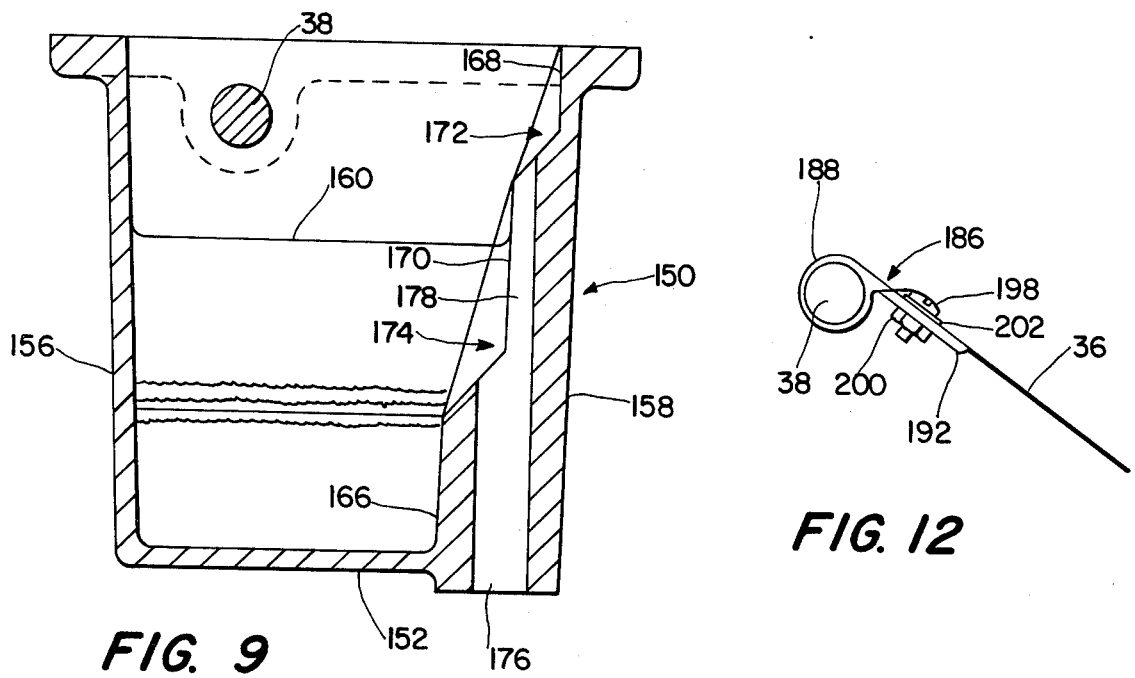
FIG. 9
FIG. 12
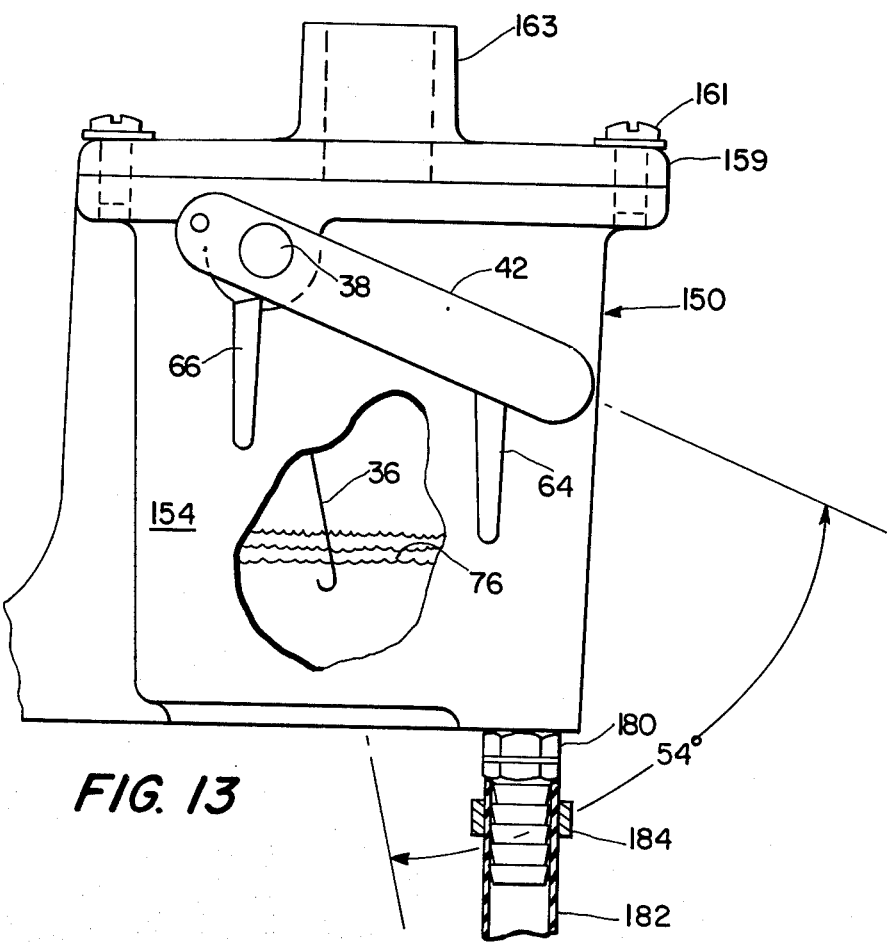
FIG. 13

FLUID METERING AND TRANSFER SYSTEM

FIELD OF THE INVENTION

The present invention relates to fluid transfer systems and more specifically relates to a system for automatically delivering a predetermined, small quantity of fluid, which in a preferred embodiment can be a lubricant, to a plurality of locations.

BACKGROUND OF THE INVENTION

There are numerous devices and pieces of equipment which are intermittently operated and only require small amounts of oil at a time at a plurality of locations. Naturally, it is imperative that the delivery system be as reliable and as accurate as possible. Many of the prior art systems for delivering fluids in relatively large quantities use pumps and valves. However, on large pieces of equipment where the lubricating fluid has to be transmitted over large distances in small quantities, the prior art systems using pumps and throttle valves are unsatisfactory. If only small amounts at a time of lubricating liquid are required, costly systems using pumps and valve are required to provide in an automatic and continuous fashion such a minute and accurately measured quantity. Valves for such small quantities of oil usually leak, suffer from capillary action problems, or have other reliability problems that make then inadequate. Furthermore, prior art devices are generally not able to provide small, metered quantities of different grades of lubricating liquids at the same time.

There are a number of prior art systems which use dippers for transferring a liquid from a reservoir to a distribution system. Naturally, those prior art dipper systems which throw off a lubricant to surrounding parts cannot be used for transferring the lubricant large distances to a plurality of locations. Lubricators which use a throwing action are disclosed in U.S. Pat. No. 1,665,451 to Gates; Bartlett U.S. Pat. No. 1,771,835; Fehr U.S. Pat. No. 546,659; and Kraut U.S. Pat. No. 1,416,840. Each of the devices in the aforementioned patents requires that the rotating parts turn fast enough so that the oil will not drip back off those parts into the reservoir. On the other hand, if the rotating parts of these devices rotate very slowly, the oil which is picked up would drip back off these parts and no lubrication would be transferred.

The U.S. Pat. No. 1,288,765 to Ulferts, on the other hand discloses the continuous transfer of one drop of lubrication at a time; and should the transfer wheel 5 rotate too slowly, the droplets would constantly drop from the transfer tube 15 without being picked up.

Other prior art U.S. patents, such as Stickney U.S. Pat. No. 1,200,149; Fitzgerald U.S. Pat. No. 2,903,995; and Harper U.S. Pat. No. 1,929,243 disclose the use of dippers rotated into a reservoir of a liquid for picking up some of the liquid and thence to a delivery point. The Fitzgerald and Harper patents disclose the use of containers on the end of the dipper and hence transfer a greater quantity of oil than merely one drop. The Stickney patent on the other hand, discloses a plurality of dippers pivotably mounted onto a shaft which in turn is rigidly mounted onto a rotating disc. This system suffers from the disadvantages that the swingably mounted dippers may splash lubricant when being immersed therein and when emerging therefrom. In addition, the amount of lubricant being delivered cannot be precisely metered since the entire length of the dipper is wiped by the wipers.

None of the known prior art devices are capable of transferring a small amount of fluid at a time and delivering said small amount to a location spaced a relatively large distance from the reservoir of the fluid.

SUMMARY OF THE INVENTION

The present invention overcomes these and other disadvantages of the prior art. The present invention provides a fluid metering and transfer system which will transfer small amounts at a time from a reservoir only when needed to a plurality of locations spaced a relatively large distance from the reservoir. The present invention provides an automatic liquid transfer system that uses gravity feed and can simultaneously transfer a plurality of different fluids. The fluid can be continuously and accurately metered and delivered or can be delivered in the case of a lubricating oily only when the equipment is in operation.

In one embodiment of the present invention, a lubricating liquid metering and transfer system is provided which can transfer, a small amount at a time, a plurality of different viscosity lubricating fluids a great distance by gravity feed at the same time to a plurality of locations in a large vertical storage tower.

The present invention is capable of delivering extremely small, predetermined amounts of fluid to a selected point in the system and still meter said amount accurately and reliably. Transfer of the fluid is accomplished due to the wetting action and surface tension of the fluid and this ensures an accurately controlled and predetermined transfer or metering of the fluid. The number of lubricated points throughout the system easily can be increased or decreased by the simple addition or deletion of an additional dipper wire and a transfer tube. Because of the metering and transferring systems obvious self lubricating characteristics it can withstand long periods of unattended use with utmost reliability. Furthermore, reasonable amounts of foreign matter and/or contaminants will not clog or restrict flow of liquid to its final destination.

A fluid metering and transfer system according to the present invention comprises a reservoir for containing a fluid, a pivotally mounted shaft spaced above the normal fluid level, and an elongate member mounted to said shaft and pivotal therewith, the elongate member extending radially from the shaft and having a length such that the member can be immersed into the fluid in a first position of the shaft. A transfer means is spaced from the shaft a distance approximately equal to the length of the elongate member and being engageable therewith upon the pivoting of the shaft to a second position. The transfer means is for receiving the fluid retained on the elongate member and for transferring said fluid to a location outside the reservoir. In one embodiment of the invention, the system is used for lubricating a conveyor and further comprises means coupled to the conveyor for oscillating the shaft between the first and second positions when the conveyor is operating.

Other features and objects of the present invention will be set forth in, or apparent from, the accompanying drawings and the detailed description of the preferred embodiments found hereinbelow.

BRIEF DESCRIPTION OF THE DRAWINGS

FIG. 9 is an end elevational cross-sectional view with parts removed of an alternative embodiment of the present invention in which the tubes inside the reservoir are comprised of indentations in the reservoir itself.

FIG. 12 is a cross-sectional view taken along lines 12—12 in FIG. 11.

FIG. 13 is an end elevational view with parts removed of the embodiment of the reservoir depicted in FIG. 9.

DESCRIPTION OF THE PREFERRED EMBODIMENTS

With reference now to the drawings wherein like numerals represent like elements throughout the several views, a fluid metering and transfer system 10 is disclosed for automatically delivering small quantities of lubricating oil to various elements of a storage tower 12. Storage tower 12 is a conventional vertical storage system in which platforms travel about on an endless link drive and the general arrangement is disclosed in U.S. Pat. Nos. 3,278,052; 3,424,321; 3,547,281; and 3,627,110.

Figure 1:
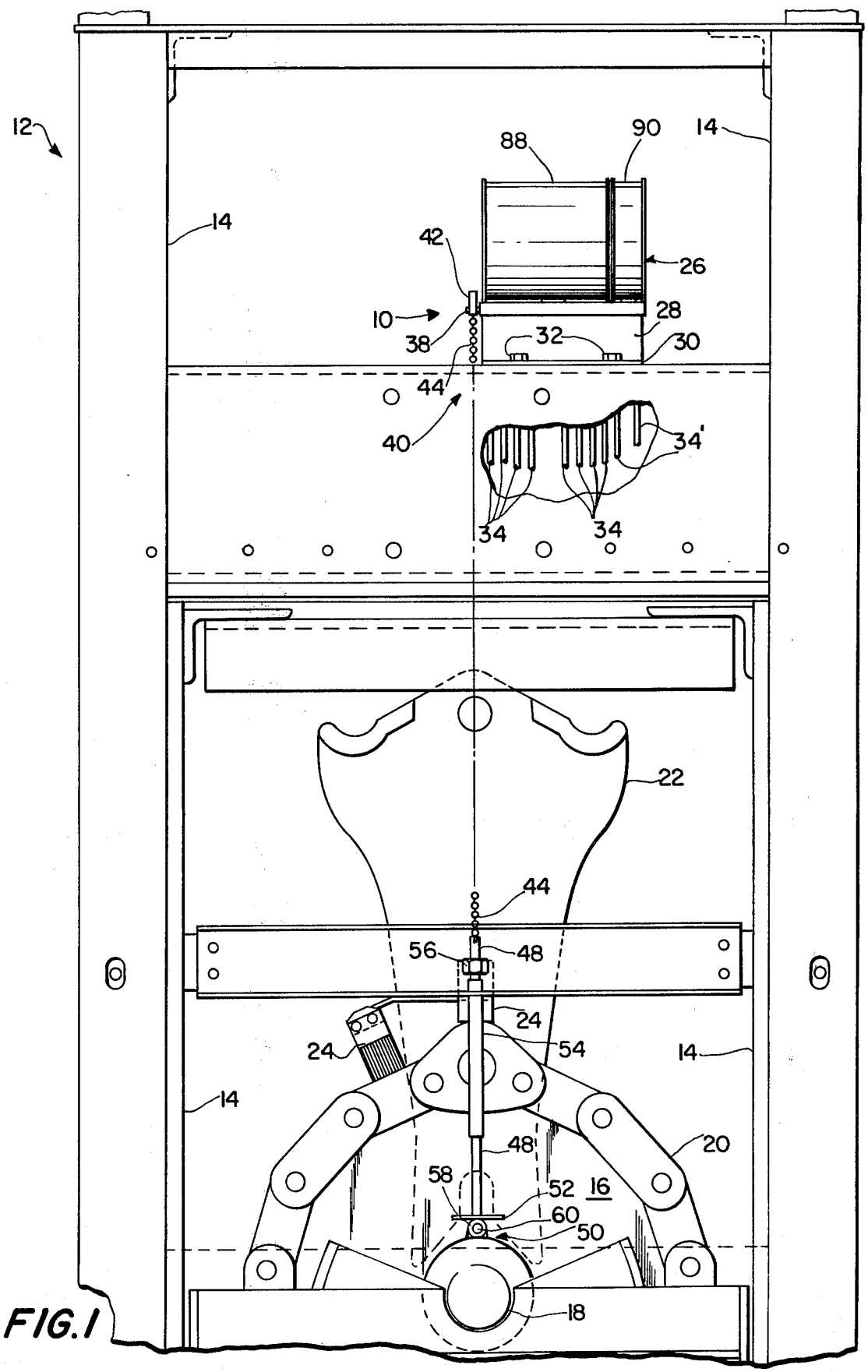
FIG. 1 is an end elevational view with parts removed and parts cut away of a portion of a tower incorporating a fluid metering and transfer system according to the present invention.

Only a portion of storage tower 12 is depicted in FIG. 1 and will only be generally described herein. Reference is made to the four listed patents for a more detailed description of storage tower 12. Storage tower 12 comprises a frame 14 on which an upper sprocket 16 is rotatably mounted by shaft 18. An endless drive chain 20 extends over upper sprocket 16 and a lower sprocket not shown. A suitable source of power (not shown) acts through suitable linkage (also not shown) to rotate drive chain 20. On drive chain 20 are a plurality of work arms, only work arm 22 being shown. The purpose of the work arms is to supportingly engage a plurality of platforms in a manner which is not important to the present invention, reference being made to the aforelisted patents for greater detail. A plurality of applicator brushes 24 engage drive chain 20 for applying lubricating oil thereto. Other points and locations (not shown) throughout storage tower 12 also receive small quantities of lubricating oil. It is the purpose of the fluid metering and transfer system 10 to supply lubricating oil to applicator brushes 24 and the other points when storage tower 12 is in use.

Fluid metering and transfer system 10 comprises a fluid storage tank 26 located above and supported by a fluid reservoir 28, which in turn is securely mounted to tower frame 14 through a flange 30 and bolts 32. A transfer system comprising a plurality of tubes 34 transfers the oil by gravity flow from reservoir 28 to brushes 24 and the other lubricated points which in turn apply the oil to drive chain 20 and the other lubricated elements of storage tower 12. A metering system, described in greater detail hereinbelow, accurately meters the oil from reservoir 28 into tubes 34 and includes a plurality of dipper wires 36 (see FIGS. 2-5) fixedly mounted on a shaft 38 and a drive means 40 for oscillating shaft 38.

Figure 3:
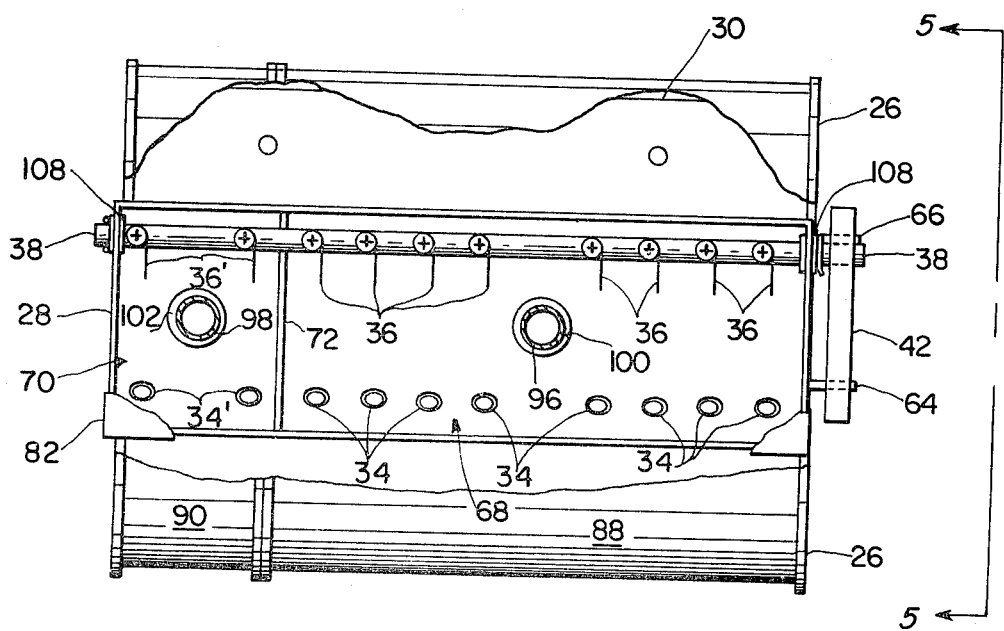
FIG. 3 is a top plan view with parts removed and parts cut away of the embodiment depicted in FIGS. 1 and 2.
Figure 5:
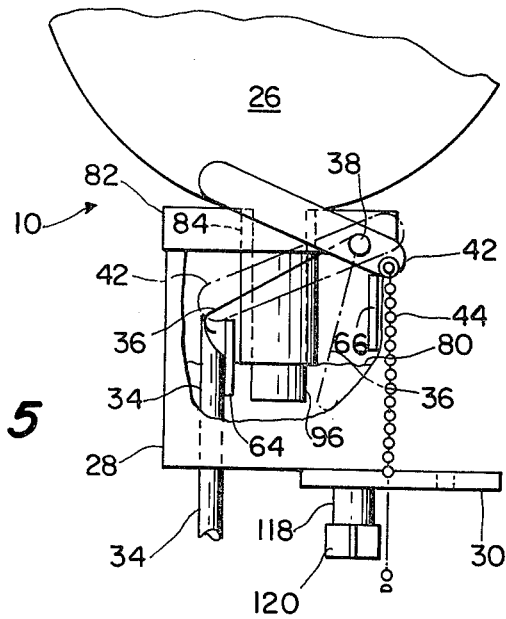
FIG. 5 is an end elevational view, with parts removed and parts cut away, taken along lines 5—5 of FIG. 3.

Referring to FIGS. 1, 3 and 5, drive means 40 comprises an elongate weight or counterbalance 42 fixedly mounted near one end thereof to shaft 38 for being a counterbalance, a bead chain 44 securely at one end with a coupling 46 to the short end of weight 42 and connected at the other end to one end of a transfer rod 48, and an oscillating means 50 coupled to and driven by storage tower shaft 18. Integral with the other end of transfer rod 48 is a disc 52. Transfer rod 48 is slidably, concentrically mounted inside a mounting tube 54 which in turn is rigidly mounted to storage tower frame 14. An axially positionable nut 56 mounted near the upper end of transfer rod 48, limits the downward movement of transfer rod 48 upon engagement of nut 56 with the top of mounting tube 54.

Oscillating means 50 comprises a cam or roller 58 which in an exemplary embodiment can be made in part from a hard, resilient material and which is fixedly mounted to sprocket 16 at a predetermined angular and radial position by shaft 60.

When storage tower 12 is in operation, shaft 18 and sprocket 16 rotate, thereby causing roller 58 to travel about a circular path. Near the top of the circular path, as shown in FIG. 1, roller 58 engages disc 52 of transfer rod 48 and drives it upwardly. The resulting relaxing of bead chain 44 allows the weight of elongate counterbalance 42 to rotate shaft 38, and hence dipper wires 36, counterclockwise as shown in FIG. 5 until further movement is limited by lower stop 64. As sprocket 16 continues to rotate, roller 58 disengages transfer rod disc 52, thereby permitting transfer rod 48 to travel downwardly, as a result of its own weight, until nut 56 strikes the top of sleeve 54. The downward movement of transfer rod 58 is coupled to the end of elongate weight 42 by bead chain 44, thereby rotating shaft 38 in a clockwise direction as viewed in FIG. 5 until elongate weight 42 strikes upper stop 66. Therefore, only when storage tower 12 is operating does drive means 40 oscillate shaft 38 and cause oil to be transferred from reservoir 28 to tubes 34 of the transfer system and through them to the points to be lubricated.

Figure 2:
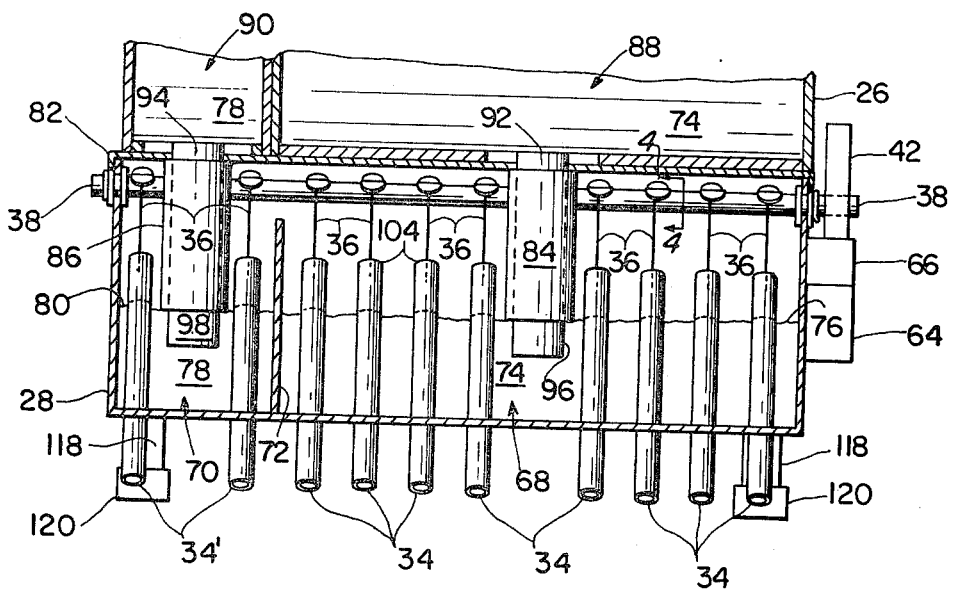
FIG. 2 is an elevational view with parts removed of one embodiment of a fluid metering and transfer system according to the present invention.

The fluid metering part of the present invention can be best understood by reference to FIGS. 2, 3, 4 and 5. As particularly shown in FIG. 2, reservoir 28 is divided into two separate compartments, a large compartment 68 and a smaller compartment 70, by an internal partition 72. Large compartment 68 contains a first lubricating liquid 74 which has a first viscosity and which is maintained at a level 76, as shown in FIG. 2, in a manner to be described, and small compartment 70 contains a second lubricating liquid having a different viscosity and maintained at a level 80 in a manner to be described.

Reservoir 28 is essentially a rectangular container having an open top and is separated into as many compartments as is needed to contain the different types of lubricating liquids. Fitted on top of reservoir 28 is a cover 82 which is for supporting storage tank 26 and for preventing contaminants from entering the lubricants. Mounted onto cover 82 and depending therefrom are two sleeves 84 and 86 which are open at both ends. When cover 82 is in place, sleeve 84 depends into large compartment 68 and sleeve 86 depends into small compartment 70.

As mentioned above, storage tank 26 is mounted on top of reservoir 28, but is spaced slightly thereabove. Storage tank 26 actually consists of two independent, coaxially aligned tanks, a large tank or compartment 88, which for example can contain one gallon of first lubricating liquid 74, and a small tank or compartment 90, which can contain for example one quart of second lubricating liquid 78. Except for corresponding filling connections, which are not shown and which are kept capped, each storage compartment 26 has only one open outlet, a first outlet 92 for large compartment 88 and a second outlet 94 for small compartment 90. Communicating in liquid tight relationship with first and second outlets 92 and 94 are corresponding, depending pipes, first pipe 96 and second pipe 98. As shown in FIGS. 2 and 5, pipes 96 and 98 are spaced apart and respectively communicate with large tank 88 and small tank 90. The spacing between first and second pipes 96 and 98 corresponds to the spacing between sleeves 84 and 86 such that first and second pipes can be concentrically received inside sleeves 84 and 86. First and second pipes 96 and 98 have a length and a diameter such that when their respective tanks 88 and 90 are mounted on top of reservoir 28, the pipes extend below the bottom of their corresponding sleeve and a corresponding gap 100 and 102 is provided between sleeves 84 and 86 and pipes 96 and 98. Gaps 100 and 102 permit the outside atmosphere to communicate with the inside of reservoir 28 until liquid levels 76 and 80 reach the bottom of pipes 96 and 98, respectively. In this manner, lubricating liquids 74 and 78 can be respectively supplied from storage tanks 88 and 90 to reservoir compartments 68 and 70 whenever the respective levels drops below the bottom of the corresponding pipes 96 and 98. If desired, sight glasses, (not shown) or other continuous liquid level indicators can be provided to indicate the amount of lubricating liquids in storage tanks 88 and 90.

With reference to FIGS. 2 and 3, reservoir compartments 68 and 70 contain a plurality of tubes 34 and 34', respectively, which extend vertically upwardly through the bottom of reservoir 28. Tubes 34 and 34' are similar and therefore only one will be described in greater detail. Also referring to diagrammatic views 6 and 7, the upward end of tube 34 has a slanted portion removed therefrom so as to provide a tapered and generally curved, triangular receiving wall 104 extending upwardly on one side of tube 34 from an open lip portion 106 on the other side of tube 34. Tube 34 can be one piece or divided into two or more parts, one part running from the outlet at the bottom of reservoir 28 and a second part in fluid tight communication with the first part, extending up into reservoir 28 and above liquid levels 76 and 80. The first part can be made of any material such as metal or a pliable plastic material, such as "TEFLON", and the second part is preferably made from a metal for ease of assembly. As discussed below, with respect to FIGS. 9 through 12, the second part can be molded into reservoir 28. In any event, it is advantageous if there is some relative flexibility between dipper wire 36 and the end portion of tube 34 and this can be achieved, for example, by using a flexible dipper wire 36 or having the end of tube 36 be flexible.

Figure 4:
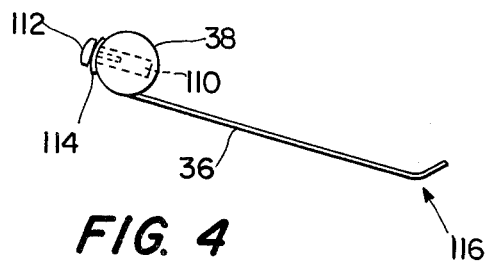
FIG. 4 is a cross-sectional view taken along lines 4—4 of FIG. 2.
Figure 6:
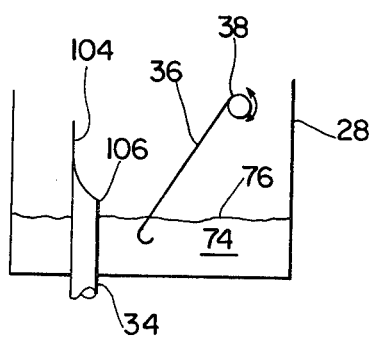
FIGS. 6 and 7 are diagrammatic views showing the contact of a dipper wire and the wall of a delivery tube.
Figure 7:
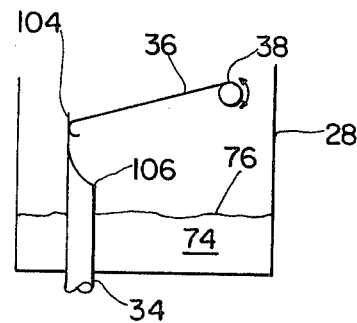

Shaft 38 extends completely across the length of reservoir 28 and is pivotally mounted in the end walls by bushings 108. Also referring to FIG. 4, shaft 38 contains a plurality of orifices 110 for mounting one end of dipper wire 36. Dipper wire 36 is retained inside orifice 110 by a screw 112 and a cooperating spring washer 114. The distal end portion 116 of dipper wire 36 can either be curved or angular (as shown in FIG. 4) or can be hook-shaped as shown in FIGS. 5, 6 and 7. The nonlinearity of dipper wire 36 provided by distal end portion 116 permits dipper wire 36 to retain a larger amount of lubricating liquid when dipped therein. With the present invention, a predetermined amount of liquid having precisely controlled dimensions can be transferred onto dipper wire 36 and the amount of liquid transferred can be varied by changing the material from which dipper wire 36 is made, by increasing the diameter or length of dipper wire 36, by changing the shape of distal end portion 116 (e.g., making it hook-shaped), or by other conventional ways.

The accurately controlled transfer of a small amount of lubricating liquid 74 from reservoir 28 into tube 34 is diagrammatically depicted in FIGS. 6 and 7. As mentioned above, the downward movement of bead chain 44 causes elongate weight 42, and hence shaft 38 to which it is attached, to rotate and thus sweeps distal end portion 116 of dipper wires 36 through lubricating liquid 74. The curved distal end portions 116 of dipper wires 36 picks up and retains one uniform amount of liquid. Upon further rotation of shaft 38, distal end portion 116 deposits upon receiving portion 104 of tube 34 which receives the lubricating oil which then falls through gravity into tube 34 and is transferred to a corresponding applicator brush 24. When tension on bead chain 44 is relaxed, the counterbalancing effect of elongate weight 42 will rotate shaft 38 back to its starting position as shown in FIG. 6. Thus, the amount of lubricating liquid delivered will depend upon the number of oscillations of shaft 38. Inasmuch as the number of oscillations of shaft 38 is controlled by the rotation of drive chain 20, the amount of lubricating liquid delivered to drive chain 20 is determined by the use of the storage tower and not by the elapsed time. Because the system of fluid transfer of the present invention relies upon the contact of the curved distal end portion 116 of dipper wire 38 with the lubricating fluid and thence to the inside surface of tube receiving portion 104, and because the eventual distribution of the lubricating liquid inside tubes 34 is by gravity, fluids having a large range of viscosities can be metered and transferred. As mentioned above, the compartmentation of reservoir 28 permits a plurality of oils having different viscosities to be simultaneously metered and transferred. As lubricating liquid is transferred from reservoir 28, the corresponding level drops below the lower edge of pipe 96 or 98, As a result, fluid flows from the corresponding storage tank in the corresponding reservoir compartment until the liquid level again rises above the lower end of the corresponding pipe.

Figure 8:
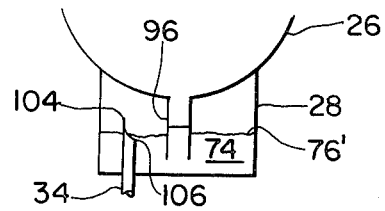
FIG. 8 is a diagrammatic view showing the transfer of liquid by raising the height of the liquid level.

As shown in FIGS. 2, 5, 6, 7 and 8, tube lip portions 106 are disposed above lubricating liquid level 76, thereby preventing the overflow of the lubricating liquid into tubes 34 under normal conditions. However, upon initial lubrication or if the storage tower 12 is not being used, the tower parts can still be lubricated, as shown in FIG. 8, simply by raising lubricating liquid level 76' above tube lip portions 106. Level 76' can be achieved by either pouring additional oil into reservoir 28 or by admitting air into tanks 88 and 90 through an auxiliary means such as a valved vent line. Reservoir compartments 68 and 70 can be drained through corresponding capped drain lines 118 having removable caps 120.

Figure 10:
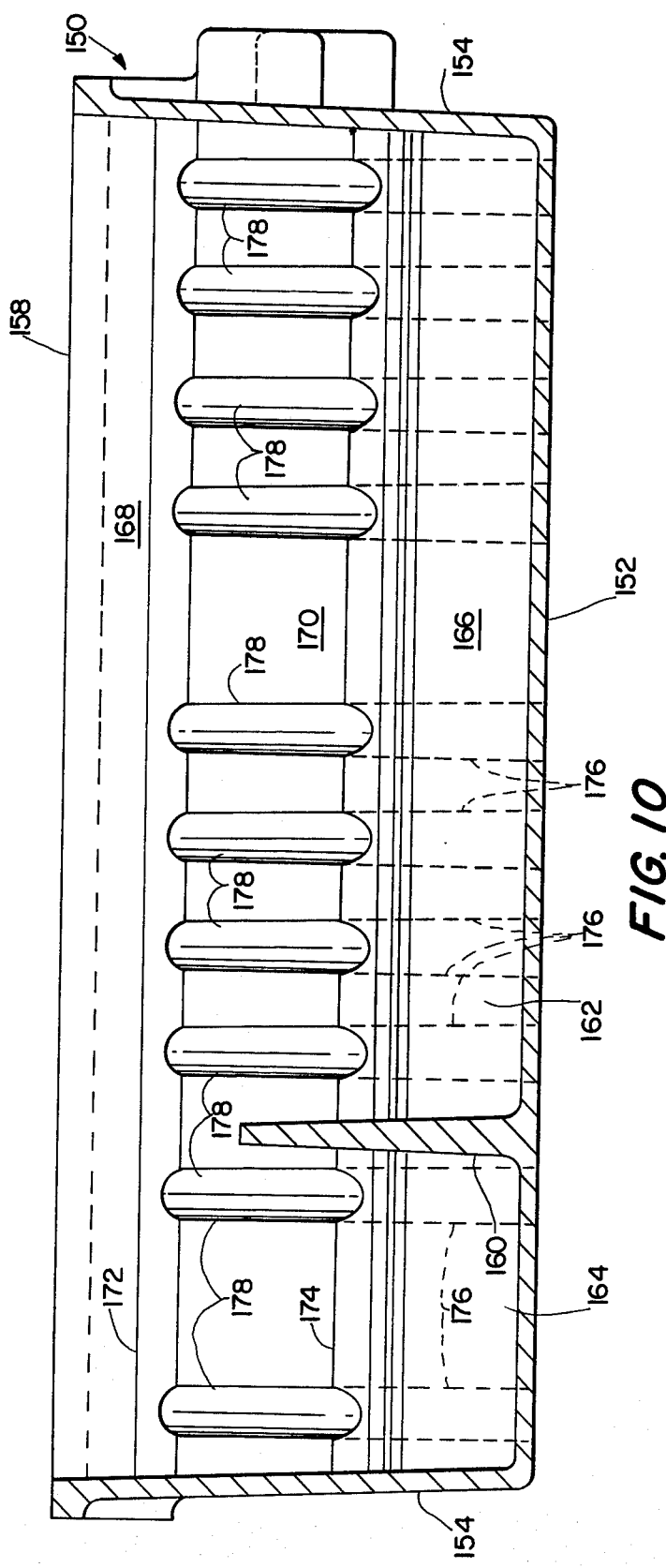
FIG. 10 is a front cross-sectional view, with parts removed, of the fluid metering and transfer system shown in FIG. 9.

With reference now to FIGS. 9, 10 and 13, a second embodiment of the present invention is depicted. A substantially box-shaped reservoir 150 is comprised of a bottom 152, ends 154, a front side 156, and a back side 158. Reservoir 150 is preferably cast from aluminum into one integral body. An inner partition 160 divides reservoir 150 into two, non-communicating compartments, a large compartment 162 and a small compartment 164. A top 159 is tightly secured to reservoir 150 with means such as screws 161. Two upstanding annular flanges 163 (only one of which is shown) with bores therein are provided on top 159 for receiving pipes 96 and 98 of tanks 88 and 90 and correspond to depending sleeves 84 and 86 of reservoir 28, depicted in FIG. 2.

With particular reference to FIG. 9, reservoir back side 158 is divided into three integral portions, a thick bottom portion 166, a thin upper portion 168, and a middle portion 170. The outer side of back side 158 is substantially vertical, thereby providing a side with a stepped increase in thickness occurring at junctions 172 and 174 between upper and middle portions 168 and 170 and middle and bottom portions 170 and 166, respectively. Preferably, the top of bottom portion 166 at lower junction 174 is slanted downwardly at approximately 45° and the interior side of middle portion 170 is slanted slightly outwardly from the vertical. Back side 158 is provided with a plurality of bores 176 which correspond functionally to the upper parts of tubes 34 in FIGS. 2 and 3. Bores 176 are preferably drilled through back side 158 such that part of middle portion 170 is cut away, thereby providing an upper contacting surface 178 that is similar to wiper portion 104 of tubes 34.

By fabricating reservoir 150 out of an aluminum casting, it is possible to eliminate bushings 108 since properly machined aluminum will act as a bushing for a steel shaft 38. Naturally, the incorporation of tubes 38 into the reservoir eliminates the need for additional elements to be independently manufactured and assembled onto reservoir 28 of FIGS. 2 and 3. The bottom of bores 176 is preferably threaded so that a hose nipple 180 can be screwed therein and secured in fluid tight relationship therewith. A plastic tube 182 is fitted over nipple 180 and secured thereon with means such as a hose clamp 184. In this way, should fewer transfer lines be required, nipple 180 can easily be removed and replaced with a pipe plug, thereby closing that particular bore 176.

Figure 11:
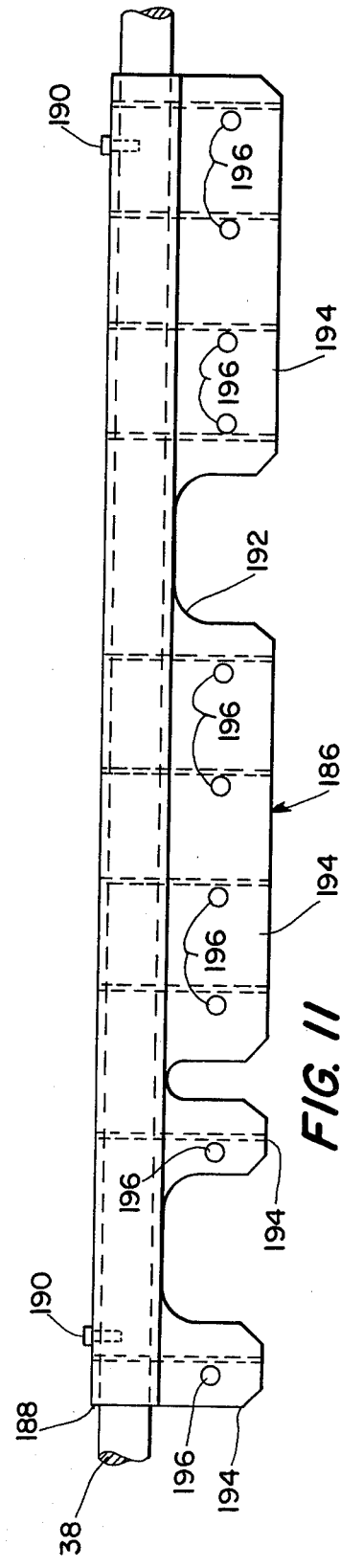
FIG. 11 is a plan view of an alternative embodiment of a means for mounting the dipper wires to the shaft.

With reference now to FIGS. 11 and 12, a further embodiment of a dipper wire support 186 is provided. Support 186 is comprised of a main sheath portion 188 for concentrically receiving therein shaft 38 and rigidly secured thereto with means such as screws 190. Extending radially outward from sheath portion 188 is a flange portion 192 divided into a plurality of segments 194. Each segment is provided with one or more orifices 196 for receiving a dipper wire mounting screw 198, a securing nut 200 and a retaining washer 202. Dipper wires 36 are easily fastened to support 186 by curling its proximal end around screw 198 and securing it between washer 202 and sheath portion 188.

The dipper wire support 186 and attachment means depicted in FIGS. 11 and 12 permits the attainment of a better uniformity in wire lengths and a greater ease of replacement. Furthermore, this type of wire attachment is easier and more economical to manufacture and install.

The present invention has now been described with respect to exemplary embodiments thereof. It can be seen from the foregoing description with reference to the concluded drawings that the present invention provides an automatic lubricating system capable of transferring very small amounts of lubricating liquid at a time to a plurality of locations. Numerous variations of the present invention would be obvious to those of ordinary skill in the art. For example, more than one dipper wire can feed a single tube, the dipper wires can have different shapes depending upon the amount of oil to be transferred, more oil can be transferred with a given dipper wire by immersing a greater portion of the dipper wire in the fluid, and the tubes 34 can supply lubricating oil to more than one location. Dipper wires may be operated in any way to obtain contact with oil, then contact with a distributing system. For example, the dipper wire could contact a brush in the delivery tube. In addition, the present system can be used with a plurality of lubricating fluids and has transferred oil as thin as "3-in-One Oil" and oil as thick as honey. A plurality of different viscosities of oil can be simultaneously transferred to a plurality of locations depending upon actual use of the storage tower. Furthermore, it should be obvious to those of ordinary skill in the art that the present invention can also be used for transferring small quantities of any type of liquid at a controlled and controllable rate. Thus, in some uses of the present invention, shaft 38 can be continuously oscillated by a separate motor and thus continuously provide a small, precise amount of liquid.

The kinematics employed by the aforedescribed wire dipper contacting a tube to transfer the liquid involves wetting action and surface tension of the transferred liquid. However, the kinematics employed can vary depending on the preferred design criteria, availability of space and other conditions.

The present invention provides an accurately controlled liquid meterizing and transfer system that does not employ valves, pumps or other expensive control devices which may be prone to leakage, wear, and inaccurate control.

Although the present invention has been described in detail with respect to exemplary embodiments thereof, it will be understood by those of ordinary skill in the art that variations and modifications may be effected within the scope and spirit of the invention.

What is claimed is:

1. A fluid metering and transfer system for transferring only very small amounts of a fluid at very low rates comprising:
    a reservoir to contain a fluid;
    a movably mounted shaft spaced above the normal fluid level;
    means for removing a very small amount of fluid from said reservoir by the adhesion of the fluid thereto, said fluid removing means comprising an elongate member mounted to said shaft and movable therewith, said member extending radially from said shaft and having a length such that at least a distal portion of said member can be immersed into the fluid when said member is in a first position and can retain fluid thereon when said member is moved out of said first position, said distal portion comprised of a wire having a predetermined diameter;

transfer means spaced from said shaft a distance to contact said member upon the movement of said shaft to a second position, said transfer means for receiving said fluid retained on said member therefrom and for transferring the received fluid to a location outside said reservoir and wherein said wire is flexible and wherein said wire and said transfer means are spaced apart a distance such that only the distal end of said wire engages said transfer means and such that said wire is flexed upon said engagement so as to permit said removed amount of fluid to be transferred upon said engagement.

2. A fluid metering and transfer system as claimed in claim 1, wherein only the distal end of said wire is immersed in said fluid, said distal end only retaining a predetermined amount of said fluid thereon.

3. A fluid metering and transfer system as claimed in claim 1, wherein said wire has a non-linear distal end.

4. A fluid metering and transfer system as claimed in claim 3, wherein said distal end is hook-shaped.

5. A fluid metering and transfer system as claimed in claim 1, wherein said system comprises a plurality of elongate members.

6. A fluid metering and transfer system as claimed in claim 1, wherein said system comprises a plurality of elongate members and a plurality of transfer means individual to said elongate members.

7. A fluid metering and transfer system as claimed in claim 1, further comprising a closed container containing a make-up supply of the fluid and disposed above said reservoir, said container having a tube extending downwardly from the bottom thereof into said reservoir and terminating above the bottom of said reservoir, said container automatically adding fluid to said reservoir whenever the liquid level therein drops below the bottom opening of said tube.

8. A fluid metering and transfer system as claimed in claim 1, wherein said reservoir comprises a plurality of separate compartments, and said system comprises at least one elongate member and one transfer means for each compartment, said elongate members being mounted on said shaft.

9. A fluid metering and transfer system as claimed in claim 1 wherein said reservoir comprises a cast body portion having a bottom, upstanding ends, and first and second, spaced apart, upstanding sides, said first side having a thick bottom portion and a thinner top portion integral therewith and spaced outwardly from the inner surface thereof; and wherein said transfer means comprises a generally vertical bore completely through said side bottom portion and in communication with the interior of said reservoir.

10. A fluid metering and transfer system as claimed in claim 9 wherein said transfer means further comprises a vertical cut away portion in said side top portion in substantially vertical alignment with said bore, and in communication therewith at a junction, said cut away portion being contacted by the end of said elongate member and receiving said retained fluid and thereupon transferring said fluid by gravity flow into said bore, and wherein, when in use, the fluid level is normally maintained below said junction.

11. A fluid metering and transfer system as claimed in claim 9 wherein said transfer means is a drilled, substantially vertical bore in said first side, part of said side top portion being cut away by said bore, and said bore extending completely through said side bottom portion.

12. A fluid metering and transfer system comprising:
a reservoir to contain a fluid;
a pivotally mounted shaft spaced above the normal fluid level;
an elongate member mounted to said shaft and pivotal therewith, said member extending radially from said shaft and having a length such that at least a portion of said member can be immersed into the fluid when said member is in a first position and can retain fluid thereon when said member is pivoted out of said first position;
transfer means spaced from said shaft a distance to contact said member upon the pivoting of said shaft to a second position, said transfer means for receiving said fluid retained on said member therefrom and for transferring the received fluid to a location outside said reservoir; and
a pivoting means for oscillating said shaft between said first and second positions,
comprising an elongate weight rigidly mounted at a location offset from the center of gravity of said weight to said shaft such that said weight pivots said shaft in one direction between said first and second positions, and
means for pivoting said shaft in the other direction between said first and second positions.

13. A fluid metering and transfer system as claimed in claim 12 wherein said shaft pivoting means comprises a rotating cam, a cam follower reciprocally driven by said cam and a flexible line connected between said cam follower and said shaft whereby said line rotates said shaft in said other direction when pulled by said reciprocating cam follower and said weight rotates said shaft in said one direction when said line is not being pulled by said reciprocating cam follower.

14. A lubrication metering and transfer system for lubricating a conveyor which comprises a drive chain rotatable on a sprocket, a drive shaft for rotating the sprocket, means for rotating said shaft and means for applying lubrication to said drive chain, said system comprising:
a reservoir for containing a lubricant at a predetermined level and located above said lubrication applying means;
a second shaft pivotally mounted;
an elongate member having a distal end portion and mounted at one end thereof to said second shaft, said elongate member having a length such that said distal end portion can be immersed in said lubricant at a first position of said second shaft, said distal end portion retaining a small amount of said lubricant by the adhesion of said lubricant thereto upon pivoting of said shaft from said first position;
a transfer tube spaced from said second shaft a distance approximately equal to the length of said elongate member such that upon pivoting of said shaft to a second position, said distal end portion engages said transfer tube so that the fluid retained on said distal end portion of said elongate member is transferred to said transfer tube which in turn transfers the transferred fluid by gravity flow to said lubrication applying means;

means coupled to the drive shaft for oscillating said second shaft between said first and second positions when said drive shaft is rotating and wherein said elongate member comprises a flexible wire and wherein said wire and said transfer means are spaced apart a distance such that only the distal end of said wire engages said transfer means and such that said wire is flexed upon said engagement so as to permit said removed amount of fluid to be transferred upon said engagement.

15. A fluid metering and transfer system comprising:

a reservoir to contain a fluid;

a pivotally mounted shaft spaced above the normal fluid level;

an elongate member mounted to said shaft and pivotal therewith, said member extending radially from said shaft and having a length such that at least a portion of said member can be immersed into the fluid when said member is in a first position and can retain fluid thereon when said member is pivoted out of said first position; and transfer means spaced from said shaft a distance to contact said member upon the pivoting of said shaft to a second position, said transfer means for receiving said fluid retained on said member therefrom and for transferring the received fluid to a location outside said reservoir, said transfer means comprising a tube, a portion of which extends beyond the opening of said tube, said portion being disposed relative to said elongate member such that said elongate member can engage the inside surface of said portion.

16. A fluid metering and transfer system as claimed in claim 15, wherein said tube extends upwardly generally vertically through the fluid and said opening of said tube is located above the level of said fluid in said reservoir.

* * * * *